(12) United States Patent
Cordourier Maruri et al.

(10) Patent No.: US 11,435,429 B2
(45) Date of Patent: Sep. 6, 2022

(54) METHOD AND SYSTEM OF ACOUSTIC ANGLE OF ARRIVAL DETECTION

(71) Applicant: Intel Corporation, Santa Clara, CA (US)

(72) Inventors: Hector Cordourier Maruri, Guadalajara (MX); Jose Camacho Perez, Guadalajara (MX); Paulo Lopez Meyer, Zapopan (MX); Julio Zamora Esquivel, Zapopan (MX); Jonathan Huang, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 598 days.

(21) Appl. No.: 16/359,101

(22) Filed: Mar. 20, 2019

(65) Prior Publication Data

US 2019/0219660 A1 Jul. 18, 2019

(51) Int. Cl.
*G01S 3/803* (2006.01)
*H04R 1/40* (2006.01)
*G01S 3/808* (2006.01)

(52) U.S. Cl.
CPC .......... *G01S 3/8034* (2013.01); *G01S 3/8083* (2013.01); *H04R 1/406* (2013.01)

(58) Field of Classification Search
CPC ..... G01S 3/8034; G01S 3/8083; H04R 1/406; H04R 2430/20; H04R 2420/07; H04R 2201/401; H04R 3/005
USPC ........................................................ 367/126
See application file for complete search history.

(56) References Cited

PUBLICATIONS

Along,: definition from Merriam-Webster, downloaded Jul. 17, 2021 from https://www.merriam-webster.com/dictionary/along, 8 pp. (Year: 2021).*
"Affect-vs-effect," Merriam-Webster, downloaded Dec. 29, 2021 from https://www.merriam-webster.com/words-at-play/affect-vs-effect-usage-difference, 7 pp. (Year: 2021).*
Fonseca, et al., "On the Design of a Compact Neural Network-Based DOA Estimation System", IEEE Transactions on Antennas and Propagation; vol. 58, No. 2; pp. 357-366; 2010.

* cited by examiner

*Primary Examiner* — Daniel L Murphy
(74) *Attorney, Agent, or Firm* — Essential Patents Group, LLP.

(57) ABSTRACT

A system, article, and method of acoustic angle of arrival detection uses both same-time and delayed-time audio signal value comparisons in a time domain that are input to a classifier neural network.

25 Claims, 11 Drawing Sheets

FIG. 3 300

RECEIVE, BY AT LEAST ONE PROCESSOR, MULTIPLE AUDIO SIGNALS FROM AT LEAST TWO MICROPHONE CHANNELS, WHEREIN EACH CHANNEL PROVIDES AN AUDIO SIGNAL FROM A DIFFERENT MICROPHONE 302

SAMPLE THE AUDIO SIGNALS AT A PLURALITY OF TIMES TO FORM AUDIO SAMPLES OF EACH CHANNEL 304

GENERATE SAME-TIME COMPARISON VALUES COMPRISING COMPARING THE AUDIO SAMPLES OF DIFFERENT CHANNELS AND GENERATED ALONG THE AUDIO SIGNALS AT SUBSTANTIALLY A SAME TIME FRAME 306

GENERATE DELAY COMPARISON VALUES COMPRISING COMPARING THE AUDIO VALUES THAT ARE BOTH OF DIFFERENT CHANNELS AND OF AT LEAST PARTIALLY DIFFERENT TIME FRAMES GENERATED ALONG THE AUDIO SIGNAL 308

DETERMINE AN ACOUSTIC ANGLE OF ARRIVAL OF ACOUSTICS FORMING THE AUDIO SIGNALS AND COMPRISING USING BOTH THE SAME-TIME COMPARISON VALUES AND THE DELAY COMPARISON VALUES 310

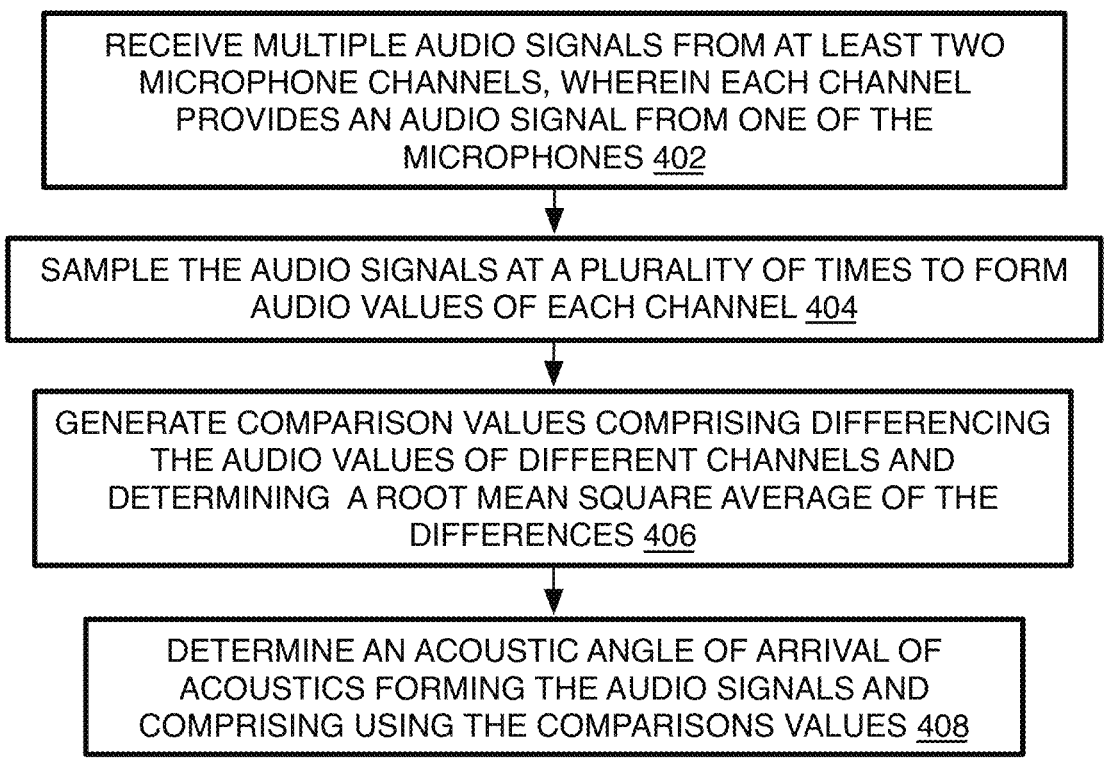

```
┌─────────────────────────────────────────────┐
│ RECEIVE SAME-TIME COMPARISON VALUES         │
│ GENERATED BY COMPARING THE AUDIO VALUES     │
│ GENERATED ALONG THE AUDIO SIGNALS AT        │
│ SUBSTANTIALLY A SAME TIME FRAME 502         │
└─────────────────────────────────────────────┘
                      │
                      ▼
┌─────────────────────────────────────────────┐
│ RECEIVE DELAY COMPARISON VALUES COMPRISING  │
│ COMPARING THE AUDIO VALUES OF AT LEAST      │
│ PARTIALLY DIFFERENT TIME FRAMES GENERATED   │
│ ALONG THE AUDIO SIGNAL 504                  │
└─────────────────────────────────────────────┘
                      │
                      ▼
┌─────────────────────────────────────────────┐
│ INPUT THE SAME-TIME AND DELAY COMPARISON    │
│ VALUES TO A CLASSIFIER NEURAL NETWORK THAT  │
│ OUTPUTS PROBABILITIES OF AN ANGLE OF        │
│ ARRIVAL BEING ASSOCIATED WITH ONE OR MORE   │
│ ANGLES 506                                  │
└─────────────────────────────────────────────┘
```

METHOD AND SYSTEM OF ACOUSTIC ANGLE OF ARRIVAL DETECTION

BACKGROUND

A number of audio computer applications analyze a human voice such as automatic speech recognition (ASR) that identifies the words being spoken or speaker recognition (SR) that can identify which person is speaking. Some audio applications can analyze other targeted sounds. For these audio applications, it is often desirable to know the location of an acoustic source relative to an audio receiving device that has an array of microphones for example. This acoustic source detection, also referred to as acoustic angle of arrival (AoA) detection, may assist communication devices, such as on a smartphone or smart speaker for example, to differentiate an intended user from other acoustic sources of interference in the background or some additional source that can be used for context awareness, where an acoustic source might be identified and an acoustic receiver may be able to determine the environment of the acoustics being received. Also, such AoA detection may enable the use of different types of audio enhancement techniques such as beamforming on certain audio devices.

Conventional AoA detection techniques, however, often have large computational loads, and therefore sometimes undesirably require fixed function hardware and, in turn, a larger foot print and greater weight on a computing device. The larger computational load also may consume too much processor time, power, and memory capacity, especially on small mobile low resource devices, such as smartphones. Otherwise such conventional techniques are often inaccurate such that these techniques provide little or no assistance to an audio application.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is flow chart of an example method of acoustic angle of arrival detection according to at least one of the implementations described herein;

FIG. 4 is flow chart of another example method of acoustic angle of arrival detection according to at least one of the implementations described herein;

FIG. 5 is flow chart of another example method of acoustic angle of arrival detection according to at least one of the implementations described herein;

DETAILED DESCRIPTION

Figure 1:
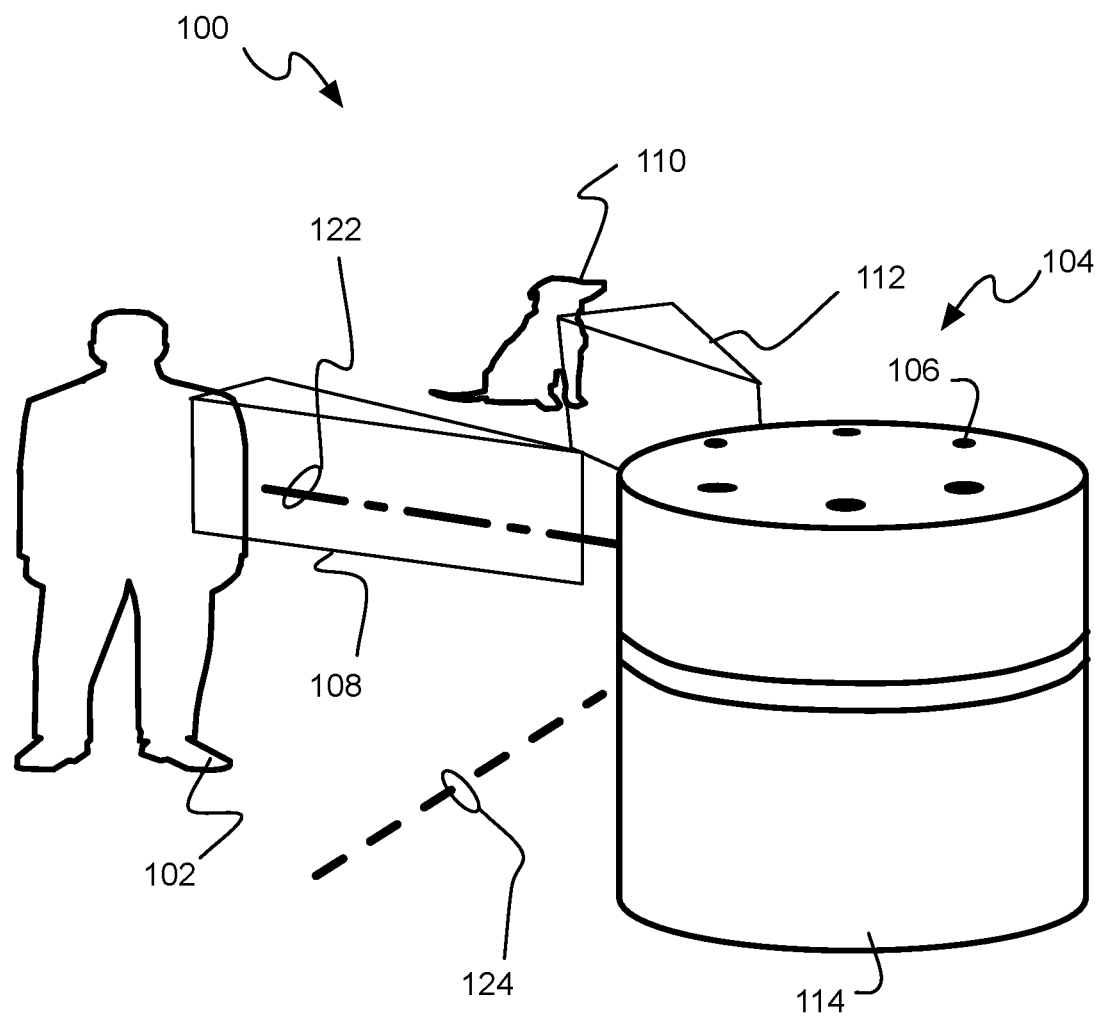
FIG. 1 is an illustration of a setting of an acoustic environment with multiple sound sources and microphones for using at least one of the implementations described herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless the context mentions specific structure. For instance, various architectures employing, for example, multiple integrated circuit (IC) chips and/or packages, and/or various computing devices and/or consumer electronic (CE) devices such as laptop or desktop computers, tablets, mobile devices such as smart phones or smart speakers, video game panels or consoles, high definition audio systems, surround sound or neural surround home theatres, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods of acoustic angle of arrival detection are described herein.

As mentioned, the detection of an angle of arrival (AoA) of sound waves to a microphone can be used to infer whether or not the sound (or acoustic waves) originates from an intended user, some other source of interference, or from some additional source that can be used for context awareness. It also enables the use of different types of audio enhancement techniques on the selected audio source such as beamforming. Once the angle of arrival is known, audio signal components of an antenna array can be combined to adjust constructive and/or destructive interference so that sound waves along the AoA can be amplified and applications may transmit data in the direction of the angle of arrival.

Generally, the known AoA detection techniques benefit from a relatively large number of microphones (or channels) in a microphone array, to provide a sufficient amount of audio data that indicates an AoA, such as five to seven microphones in an array. AoA can be obtained with arrays of fewer microphones, but correct angle detection may not be as precise.

One known technique for detecting the AoA of a sound source collects audio signal data from microphone arrays and performs fast Fourier-transform (FFT)-based cross correlation, which is able to detect a time difference of arrival (TDOA) of each audio signal among all the different signals from each microphone. Converting the input audio into the frequency domain requires some computer overhead, and is usually performed by dedicated digital signal processors (DSPs) that can consume a large amount of power and add weight on small devices.

Another known AoA detection technique uses relative signal amplitudes that indicate the loudness of the acoustics. Specifically, this technique relies on the use of the relative amplitude of the signal in each microphone of a microphone array by identifying the direction of the highest amplitude to determine the angle of arrival of audio. This relative signal amplitudes technique provides quick responses, but cannot deliver precise results. It is usually employed for "quadrant" detection, i.e., 90 degree resolution for four possible general directions. This type of technique requires precise pre-calibration because microphones could have different gains (or loudness) which affect the amplitudes so that the direction may be inaccurate.

One known variation of the relative signal amplitudes technique uses a feedforward neural network such as a multi-layer perceptron (MLP) network, and is trained on three beam functions in an antenna array to capture the amplitudes which are used as features (or input) to train a neural network. This operates mainly on electromagnetic waves rather than sound waves. See, N. Fonseca et al., "On the design of a compact neural network-based DOA estimation system," IEEE Trans. Antennas Propag., vol. 58, no. 2, pp. 357-366 (2010). This technique, however, also has a heavy computational load, requires dedicated fixed function hardware circuitry in order to produce a real-time output of the difference of the antennas' input signal in certain fixed delay-and-sum beams, also resulting in a relatively large amount of power consumption.

In another conventional alternative, sound sources can be detected with the use of an additional sensor, such as a camera, IR sensor, and so forth that provides a visual indication of the location of the source, which adds substantial extra hardware costs. Moreover, this technique requires a relatively large amount of operations and computational load to detect objects in images, such as a face, in addition to the added camera hardware, resulting in a large amount of power consumption.

To resolve these issues, the method and system described herein provides an efficient feature extraction technique to provide feature input to an angle classifier that minimally processes the digital data and avoids the requirement of dedicated hardware circuitry. One form of the disclosed method detects a relatively precise AoA from an audio source using a root mean square (RMS) of the difference between microphone (or channel) signals, or specifically, as one example, the RMS of the difference of normalized time domain signals from all possible microphone pairs. The RMS is used as a feature input to a machine learning algorithm such as a shallow Neural Network (NN) as an angle classifier. By one form, the feature (or input) RMS values are obtained from differences in audio samples (where audio samples are also referred to herein as audio values, audio signal values, or signal values) from channel to channel for both audio samples of the same time frame and audio samples of different time frames (referred to herein as a delay). The neural network outputs an indication of the AoA thereby establishing the detection of the angle.

These operations result in a very lightweight AoA detection method and system that does not require the computation of an FFT or other types of numeric or non-numeric frequency domain transforms or signal processing routines. Therefore, it reduces the computational load and does not require dedicated hardware such as DSP acceleration as in typical usages, thereby significantly reducing power consumption. Also, the presently disclosed method provides high performance since this method is able to detect the AoA with high precision, and without a tradeoff of power consumption. Thus, the present method can be deployed in just about any existing microphone array without the need for additional sensors or processor hardware. Also, since the present method and system can operate largely without special pre-processing or tuning of the audio signals, the present method is not affected by an acoustic environment in which each microphone has a slightly different gain, and high performance angle detection can be obtained in acoustic environments with rooms of vastly different sizes and shapes. In addition, the present method is not limited to a minimum number of multiple microphones and could be used with just two microphones as described below.

The result is a method and system that presents an experimental accuracy of about 88.2% to detect an AoA over a 1/72 resolution as the outputs of the classifier neural network, and performs about four times faster than a conventional FFT cross-correlation AoA detection method. Compared to a conventional AoA detection system with extra sensors to locate the audio source such as with face detection, a face detection algorithm such as multi-task cascaded convolutional network (MTCNN) usually has three CNN models of 4,5,5 convolutional layers respectively, and the computational cost is at least about fifteen times greater than that of the present method, depending on the image resolution. More details are provided below.

Referring to FIG. 1, an example acoustic environment or setting 100 is shown to assist with explaining the AoA detection system and methods described herein. The acoustic environment 100 includes a user 102 that is speaking and emitting acoustic waves 108 into the air, a microphone array 104 on a computing device 114 that is spaced a distance from the user 102 and has a surface with openings to six microphones 106 arranged in a circle and each forming an audio signal (or data) channel. The microphones 106 sense the acoustic waves 108 from the user 102. While the microphone array 104 is shown with six microphones 106, more or fewer microphones may be used, and by one form, at least two microphones.

The microphone array 104 may be on a device 114 such as a smart speaker, and in this case, the computer components and modules, including the software, hardware, and/or firmware used to operate the disclosed AoA detection method may be physically located in the body of the computing device 114 as shown. Otherwise, the device 114 may only be a microphone array device, and the processing of the AoA detection method is performed on a remote device, whether wireless or wired, that is in communication with the device 114.

An interfering acoustic or sound source 110, here represented by a barking dog, emits its own acoustic waves 112 that will interfere with the acoustic waves 108 from the user as the acoustic waves travel towards the microphone array 104. Thus, knowledge of the AoA indicating a direction toward the user 108 may enable tuning of the audio signals to emphasize (or amplify) the desired sound and acoustic waves 108 from the user, and de-emphasize (or attenuate) the acoustic waves 112 from the interfering source 110.

A detected AoA 120 then may be established between an AoA axis 122 extending in a direction from the receiving device 114 and toward the source 102, and relative to a reference (or zero) direction 124. A classifier neural network (described below) with outputs associated with the range of possible AoAs is trained to indicate AoAs relative to a reference direction 124 in a known direction fixed relative to a microphone array.

Figure 2A:
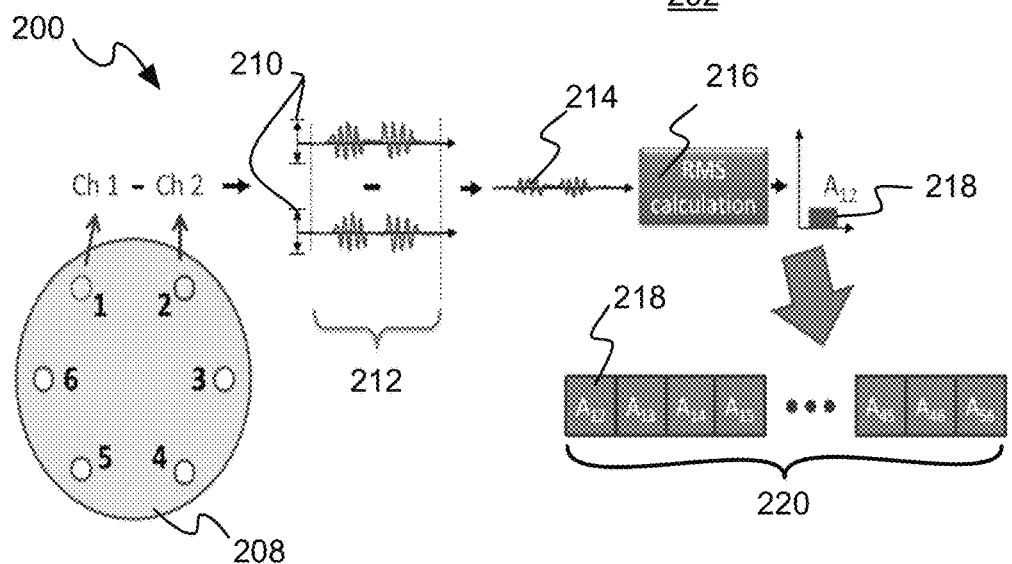
FIG. 2A-2C are schematic flow diagrams showing operations of an example method of acoustic angle of arrival detection according to at least one of the implementations herein.
Figure 2B:
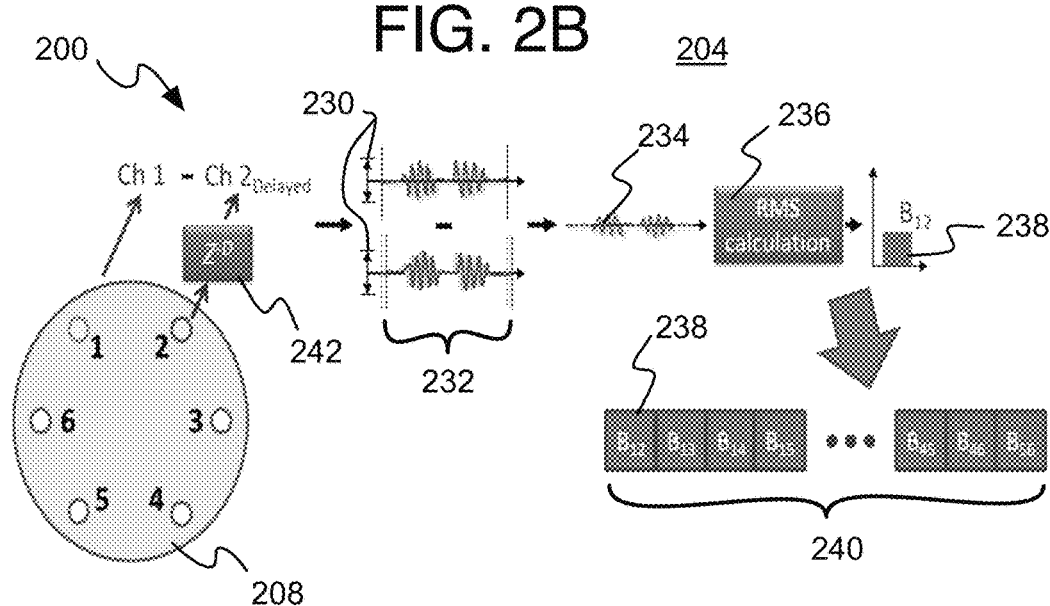
Figure 2C:
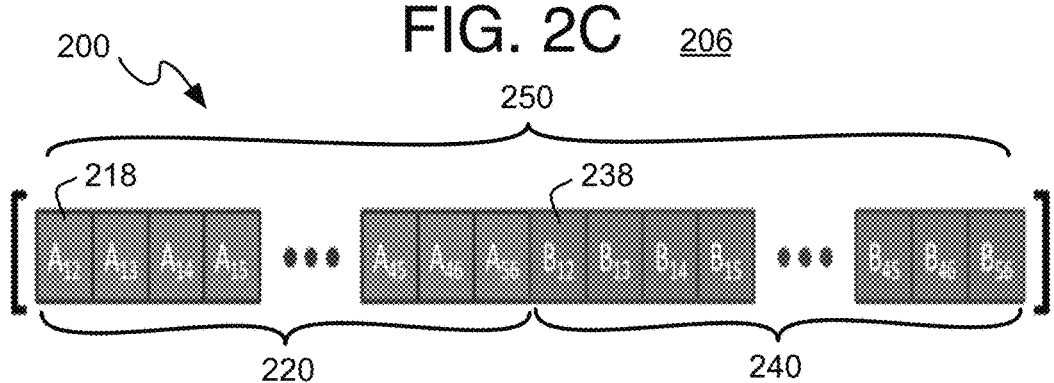

Referring to FIGS. 2A-2C, an example process 200 for a computer-implemented method of acoustic angle of arrival detection is described schematically and includes three stages 202, 204, and 206. In a first stage 202, the process 200 differences audio signal samples from different channels but from the same time frame. A comparison value, that represents the differences between each pair of samples that are compared, is referred to herein as a same-time comparison value. This comparison value may be calculated and may be an average or other combination value of the differences, such as a root mean square. The same-time comparison values may be placed in a feature vector used as input to a classifier machine learned algorithm such as a neural network. The second stage finds differences among the different channels, except this stage includes finding differences between audio samples of different time frames. The representation of these delay differences (referred to as delay comparison values) also are placed in a vector which is then concatenated with the same-time comparison values vector for input to the classifier. Thus, it will be understood that this feature vector maintains values in the time domain rather than converting the samples or sample differences into the frequency domain thereby avoiding the use of FFT or other similar conversions. In the third stage, the classifier provides outputs that indicate the most likely angle (or range of angles) of arrival. The details of the process 200 are as follows.

A circular microphone array 208 has six channels numbered one to six. Many other configurations of microphone arrays may be used such as linear or spherical, and as long as at least two microphones are present. Thus, the method herein can be scaled to a minimum two mic system (for a 180° angle detection), or three mic system (for full 360° detection). Additional microphones can, in practice, increase the precision and granularity of the angle detection. This is convenient for most use cases of smart spaces and/or vehicles. Otherwise, the microphones, and microphone array, are not limited to any specific type of microphones.

While the audio signal is described herein as including human speech, the present methods will work when the audio signal is other than human speech and may be formed from other sounds such as non-speech human sounds, animal sounds, other sounds from nature, music, other industrial sounds, and so forth, and is not always limited to human speech.

Each microphone senses acoustic waves that are converted into an audio signal on a separate channel (for example, ch1 for microphone 1, ch2 for microphone 2, and so forth) so that each channel, here all six channels, initially provides a raw audio signal. The audio signals then may be pre-processed such as by analog to digital (ADC) conversion, de-noising, dereverberation, and otherwise to convert the signals into versions of audio data or signals that can be used for AoA detection and other applications. By one form, pre-processing may be performed as long as all channels are treated with the same pre-processing to avoid unintentional introduction of greater channel differences that could influence the AoA detection.

The process 200 generates samples of the audio signals with a duration of approximately 250 ms each at 16 kHz intervals, although other sampling rates may be used instead, and each set of samples obtained for the same time frame may be referred to herein as a frame. By one form, the present AoA detection process needs the acoustic sources to remain relatively fixed within the acoustic environment while obtaining the samples in order to provide near real time analysis. Thus, the samples are obtained for durations of at about or less than 250 ms by one form, but may be up to 500 ms by other forms. This has been found to be sufficiently close to real time (or near instantaneous) relative to the motion of a typical human. While this may not be considered precisely instantaneous, it is still reasonable for most audio and/or speech purposes in which an AoA is computed relatively sparsely in time (which is much less than an AoA detection rate typically needed for radio frequency (RF) applications). This increase in sample duration (or time frame length), and in turn, reduction in total feature extraction speed to provide input features to a classifier (or sample duration or time frame length) is one of the reasons that enables the present system to be particularly lightweight.

This duration of the sample is referred to as a time frame herein such that samples obtained from different channels at substantially the same time frame are considered samples of the same time. Those time frames with different start and/or end points are considered samples from different time frames, even though such time frames could overlap.

An operation that may or may not be considered as part of pre-processing is normalization (represented by the brackets 210 shown on FIG. 2) of the audio signals from individual or each channel. By one form, L1 normalization may be applied but could be other forms of normalization such as L2 or simply dividing by the maximum value.

Then by one approach, process 200 proceeds to compare 212 the sample of one channel to individual or all other channels for the same time frame. By this approach, the comparisons are repeated for each pair of channels from the microphone array 208 until all possible comparisons between sample pairs of the same time frame is performed once. Thus, a sample of channel Ch1 is separately compared to each of samples of channels Ch2 to Ch6 of the same time frame. Each comparison between pairs of samples (also referred to herein as comparison between pairs of audio signals or pairs of channels) forms a difference sample or difference signal (or just difference) 214. The difference signal 214 covers a time frame of audio signal values that are all differences from the subtraction of amplitudes of an audio signal of one channel from an audio signal of another channel. Continuing with the other channels, channel Ch2 is compared to each of samples of channels Ch3 to Ch6 of the same time frame, and so forth. Repeating comparisons of the same two channels whether or not in the same order is not necessary for efficiency and to maintain a low computational load. In other words, since there is a difference signal $DS_{12}$ (214 on FIG. 2) there is no need for $DS_{21}$ (where the subscripts indicate the channel number and subtraction order).

A single representative final comparison value or feature A (as an example, 218 on FIG. 2) then may be obtained by computing a representation of the audio values in the difference signal or values 214. By one form, this is performed by an operation 216 that computes a root mean square (RMS) average (or just average or just RMS herein) of the signal values within the difference signal 214. The result is a same-time comparison value $A_{12}$ (218) for the comparisons of channels 1 and 2 and being the RMS average of the difference values in the difference signal that is a result of that comparison. This is repeated for each comparison (or difference signal) 214 obtained, here for six channels being 15 resulting comparison values $A_{12}$ to $A_{56}$ (218).

The resulting comparison values $A_{12}$ to $A_{56}$ (218) then may be placed in a same-time vector 220 (indicating that the representation comparison values A in the vector are based on sample comparisons from the same time frame). Thus, one same-time vector is provided for each time instance (or time frame). The order of the comparison values in the vector may be the order expected as inputs to the classifier.

In a second stage 204, many of the same operations are repeated such that they need not be described again here, and are provided with similar label numbers as shown on FIG. 2B, except that the samples being compared to each other for the second stage are not from the same time frame. Thus, an intentional delay is used when obtaining one of the samples to be compared to a channel of a current or first time frame. Specifically, one of the channels being compared is delayed by a small and fixed amount of "D" samples (for example, about 2 samples when using the sample frequency of about 16 kHz) before performing the subtraction (or comparison). By one form, a current time frame is the same time frame used to form the same-time vector in the first stage, and a delayed time frame for comparison to the current time frame in the second stage is a time frame that is delayed or comes after the current time frame. This can be accomplished by storing the samples in a buffer, and then obtaining 242 the samples Z-D to form the second channel (such as example channel $2_{Delayed}$) at a delayed clock timing for example. The delay sample is delayed by the desired number of samples or other interval used to determine the timing between a current time frame and delayed time frame. This delay can also be accomplished by deliberately storing the audio data of multiple channels in time sample order and in a slightly larger buffer. The delay then may be established by comparing the data of different channels by an indexing difference of the desired amount of time samples in the delay.

The representative delay comparison values are computed the same as in the first stage, such as RMS averages, and are designated as delay comparison values $B_{12}$ to $B_{56}$ for the six mic array 202. The delay comparison values also are collected into a delay vector 240.

In a third stage 206 shown for process 200, the same-time vector 220 and delay vector 240 of comparison values (and here the RMS average values) obtained in the former stages are concatenated into a single final feature vector or time vector 250 that corresponds to the analyzed current time frame. The concatenated vector 250 now with 30 elements for the six mic array 202 is then input to a classifier as described in detail below.

Referring to FIG. 3, an example process 300 for a computer-implemented method of acoustic angle of arrival detection is provided, and specifically involving the use of both the same-time and delay comparison values to determine the AoA. In the illustrated implementation, process 300 may include one or more operations, functions or actions as illustrated by one or more of operations 302 to 310 numbered evenly. By way of non-limiting example, process 300 may be described herein with reference to example process 200 (FIG. 2) and acoustic signal processing system 1100 described herein with FIG. 11, and where relevant.

Process 300 may include "receive, by at least one processor, multiple audio signals from at least two microphone channels, wherein each channel provides an audio signal from a different microphone" 302. Thus, as described above with process 200, a microphone array may provide a number of microphones and corresponding number of channels, where each microphone converts received acoustic waves into an audio signal. This operation also may involve pre-processing the audio signals sufficiently for acoustic angle of arrival detection, such as ADC.

Process 300 may include "sample the audio signals at a plurality of times to form audio samples of each channel" 304, which involves the sample generation mentioned above, forming samples of each signal that is a certain time frame of audio signals (or audio digital values representing the signals). By one form, an individual sample, and in turn the time frame, is about 250-500 ms in duration and are sampled at about 16 kHz.

Process 300 may include "generate same-time comparison values comprising comparing the audio samples of different channels and generated along the audio signals at substantially a same time frame" 306, which relates to the stage one of process 200. As mentioned, this may include determining a comparison value, such as by finding a representation or average of a difference signal, for each pair of samples compared to each other, and of the same time frame, which in one form includes comparing each channel to every other channel on the microphone array once and only once. Alternatively, less than all comparisons could be included, such as by comparing every other sample to a current sample, or some other interval to further reduce computational load such as memory model size, or RMS processing time even though the results may not be as precise. By the form mentioned above, a root mean square (RMS) average of the difference signal is the same-time comparison value that is generated here for each comparison of samples.

Process 300 may include "generate delay comparison values comprising comparing the audio values that are both of different channels and of at least partially different time frames generated along the audio signal" 308. This involves the stage two of process 200 and as mentioned above, has similar operations as stage one except here each or individual comparisons are between a sample of a current time frame and a sample of a delayed time frame, and by one form where the delay is measured by a number of samples obtained along the received audio signals (or an audio signal time line). The time frames may overlap but are at least partially different. Thus, the two time frames cannot have both the same start and end time points. By one form, both end points are different so that the time frames do not overlap at all, and by one example, are two samples apart.

Process 300 may include "determine an acoustic angle of arrival of acoustics forming the audio signals and comprising using both the same-time comparison values and the delay comparison values" 310. Thus, where the same-time comparison values and the delay comparison values are placed in vectors that are then concatenated. As described herein, this final feature vector formed by concatenation then may be an input to a classifier such as a neural network. The outputs of the neural network may provide a probability that a specific angle or range of angles is the AoA. Thus, an output may exist for each angle to be assessed, and by one example, 72 outputs are provided to cover 5 degrees each whether the output indicates probability of a specific five degree angle (5°, 10°, 15°, and so forth) or a specific range of angles (0-5°, 6-10°, 11-15°, and so forth) although other number of outputs and variations could be used instead. This may include from 1° intervals (classes) for ultra-precise direction indication, to very broad source detection (like quadrant detection).

Thereafter, it may be determined which output has the largest probability as the AoA. Otherwise, all angles above a threshold may be combined, such as averaged or some other combination may be used. A value indicating the AoA, whether the value of the angle itself or some other representation, such as a binary representation or flag on an overhead of a file of the audio data, depending on what is expected, may be provided to transmission applications, such as a beamformer application, and otherwise to end applications, such as automatic speech recognition (ASR) or speaker recognition (SR) applications for example. With such guided beamforming, the ASR and SR quality will be improved despite the reduction in computational load, which permits reduction in memory capacity requirements, power consumption, and hardware foot print, thereby contributing to easing of small device parameter restrictions.

Referring to FIG. 4, an example process 400 for a computer-implemented method of acoustic angle of arrival detection is provided, and the method involves the root mean square (RMS) computation for computing comparison values as described above. In the illustrated implementation, process 400 may include one or more operations, functions or actions as illustrated by one or more of operations 402 to 408 numbered evenly. By way of non-limiting example, process 400 may be described herein with reference to example process 200 (FIG. 2) and acoustic signal processing system 1100 described herein with FIG. 11, and where relevant.

Process 400 may include "receive multiple audio signals from at least two microphone channels, wherein each channel provides an audio signal from one of the microphones" 402, and as already described above with process 200 and 300.

Process 400 may include "sample the audio signals at a plurality of times to form audio values of each channel" 404, also as described above with processes 200 and 300.

Process 400 may include "generate comparison values comprising both differencing the audio values of different channels and determining a root mean square average of the differences" 406, and as mentioned, this may involve determining difference values or a difference signal for both samples being compared in a same time frame and samples being compared from different time frames where one of the time frames is a current time frame and one is considered a delayed time frame. A representation of the difference values or difference signal then may be computed, and by one example, that is a time domain representation to avoid large computational loads. By one form, the time domain representation is an RMS average of the difference values within the relevant time frame, but could be other representation or combination values such as signal integration, moving average of the square amplitude, or any similar technique that represents, or is related to, the energy content in the signal frame difference.

Process 400 then may include "determine an acoustic angle of arrival of acoustics forming the audio signals and comprising using comparisons values" 408, and by using a machine learned algorithm. The example provided herein is the use of a classifier neural network, described above with process 300 and in detail below with process 500.

Referring to FIG. 5 with regard to the classifier neural network, an example process 500 for a computer-implemented method of acoustic angle of arrival detection is provided. In the illustrated implementation, process 500 may include one or more operations, functions or actions as illustrated by one or more of operations 502 to 506 generally numbered evenly. By way of non-limiting example, process 500 may be described herein with reference to example process 200 (FIG. 2) and acoustic signal processing system 1100 described herein with FIG. 11, and where relevant.

Preliminarily, the classifier neural network is trained by first collecting a training dataset. The audio may be obtained using an actual acoustic environment that mainly refers to the use of an audio capture device in various real world conditions instead of experimental conditions with controlled environmental parameters. The data may be collected as for the operation with the neural network in various conditions and by a microphone array as described above. The neural network may be trained in a supervised manner so that desired probabilities may be set for each output AoA to determine the weights of the hidden layer. The training also may include synthesized or simulated audio samples using specialized software models to augment training data or provide data of environments that are difficult or impractical to measure in reality.

Whether for training or run-time operation of the AoA detection process, process 500 includes forming the comparison values for input to the neural network. Thus, process 500 may include "receive same-time comparison values generated by comparing the audio values generated along the audio signals at substantially a same time frame" 502, and "receive delay comparison values comprising comparing the audio values of at least partially different time frames generated along the audio signal" 504. These datasets were concatenated as described above to form a single input set of feature vector data for each time instance (or time frame).

Process 500 next may include "input the same-time and delay comparison values to a classifier neural network that outputs probabilities of an angle of arrival being associated with one or more angles" 506. Precisely, a shallow fully connected neural network of 30 elements in the input layer may be used for a six microphone array. A 60 element hidden layer with a sigmoid activation function may be used, and the 72 element output layer may use a Softmax activation function (representing the $1/72$ angular resolution). The 72 outputs each cover 5 degrees to thereby cover 360 degrees in total, and relative to a fixed reference or zero degree direction 124 (FIG. 1). As mentioned, the outputs of the neural network may each provide a probability that is used to indicate an AoA whether a particular single angle or a range of angles, or probabilities from multiple outputs could be combined to form a representation angle, such as by an average. The probability value may be provided to other applications, or may be converted into a value that is expected by the other applications such as an angle value rather than a probability, or other representation such as binary value or flags and so forth, and as mentioned above. Many variations are contemplated, like a quadrant or a punctual angle, depending on the application that might be required by the user or the final product in which this routine may be embedded.

Tests

In a first test of the effectiveness of the disclosed acoustic AoA detection system, a training and testing routine was performed using only simulated audio data with the image source method (a system that models room environments very realistically). This test included the following parameters and operations. First, with regard to the acoustic environment, simulated impulse responses (IRs) were generated for audio sources located in 864 different positions, in 36 different room sizes. The microphone array being used was a six microphone circular array (diameter of 6.5 cm) located in the middle of each test room.

Second, with regard to the audio content from the simulated source, multiple audio samples were generated using random audio content in which voice, music, brown noise, and white noise samples were included. The IRs generated for the simulated source acoustics included 1.5M samples for training and 0.3M samples for testing. The sample frequency for these signals was 16 kHz, and each sample was set at a 250 ms duration.

Third, features were extracted to form input for the neural network classifier and from the generated audio samples using the disclosed process 200 (FIG. 2) described above. The delay was fixed at D of 2 samples (D=2, in the current tests) which provided good results as described below. Fourth, the features were input to a classifier neural network with a shallow fully connected neural network with 72 outputs as described above with processes 300 and 500.

Figure 6:
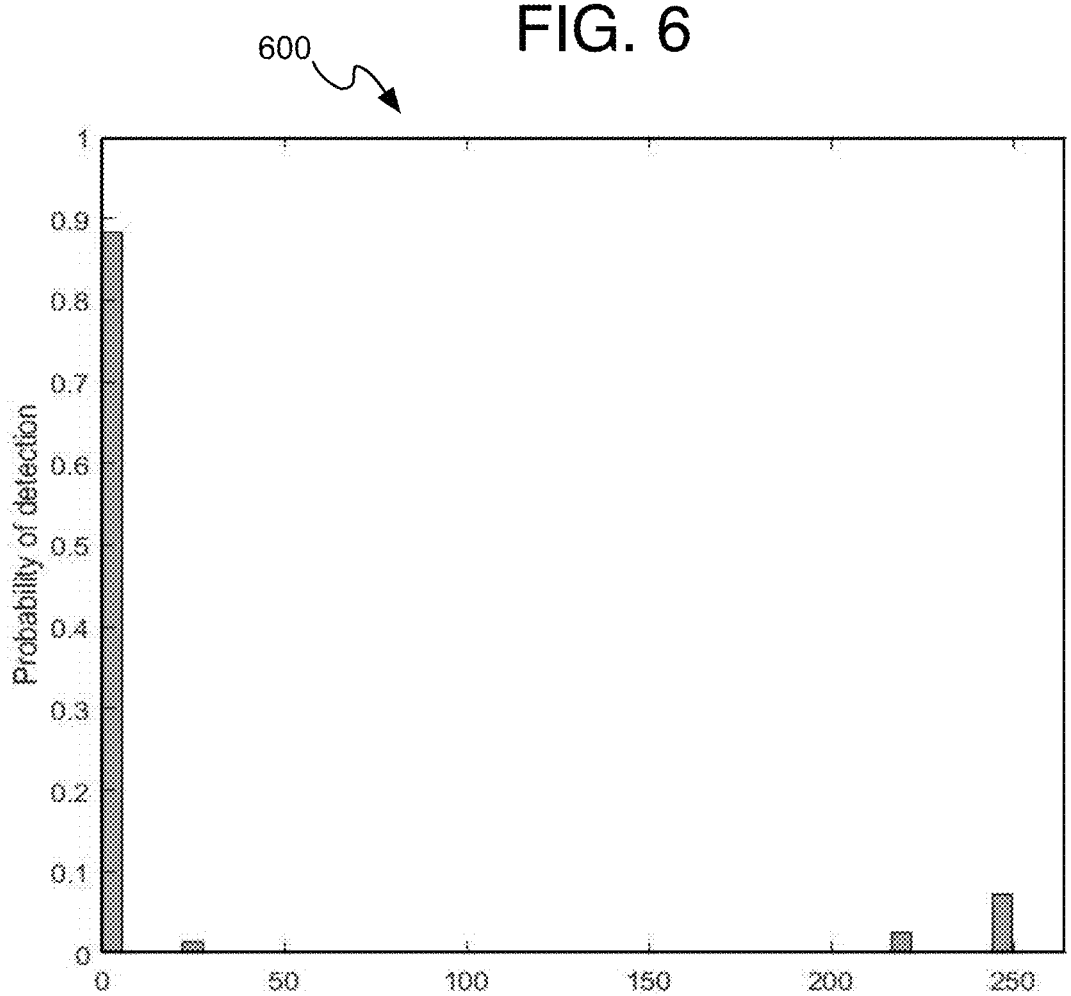
FIG. 6 is a histogram of the probability of correct angle detection determined by using one of the implementations herein.
Figure 7:
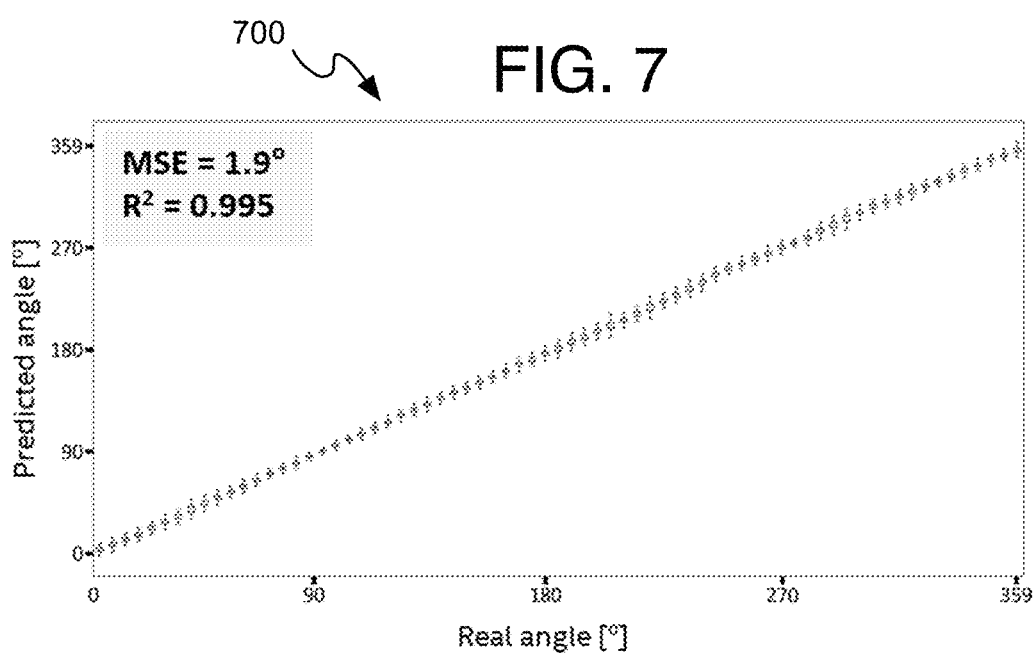
FIG. 7 is a graph of a boxplot of predicted and detected angles based on simulated audio data versus real angles according to one of the implementations herein.

Referring to FIGS. 6-7, a histogram 600 shows the probability of correct detection obtained by using the simulated data to perform the disclosed AoA detection method. The results show an 88.2% accuracy (and in turn, at 0 degrees of error) of correct AoA classification in a single-time frame measurement. Additionally, accuracy is expected to increase when using a multiple-time frame measurement rather than a single frame as used for the histogram 600. This is due to the fact that most missed classifications are off by 220-250 degrees, which indicates that the errors are produced at large distances from the correct values and, in continuous real time processing, these errors will be easy to identify as sudden "jumps" in the measurement that should be subjected to filtering for removal.

As shown on the boxplot 700 of the predicted (or detected) angle estimation versus real (simulated) angles, the results produce a regression with a Mean Square Error (MSE) of about 1.9°. Each mark in the boxplot has a center box that indicates the predicted values of 90% of the samples tested at a certain degree angle, and between upper and lower error limit lines (or sample points). This is the same for each of the boxplots on FIGS. 7, 9, and 10. As can be seen here on boxplot 700, the detection shows some overlap of the correctly detected angle with the angle classes occurring just after and before that of the detected angle, but it presents a sufficiently clear prediction relationship that produces an about 0.995 Pearson correlation coefficient, indicative of a very strong correlation.

In a second test using actual (real-life) captured acoustic data, IRs forming acoustic waves were obtained from source locations within an acoustic environment that had a circular microphone array. The source locations were set to emit acoustics and generate or measure IRs every 20° around the microphone array from a reference direction, and at 0.30, 0.55 and 0.80 meters from the center of the microphone array at each 20° angle. Then, audio was filtered using the obtained IR to produce sound that would be produced in the measured locations, and the audio signal from the IRs were used to generate 1,000,000 training and 300,000 testing samples of the same duration (or size) and sample frequency that the simulated test used (250 ms, at 16 kHz). The same classifier neural network as that described above with process 500 also was used. The IR is a filter that allows generating sound from a certain space in an environment by filtering the acoustics in the space.

Figure 8:
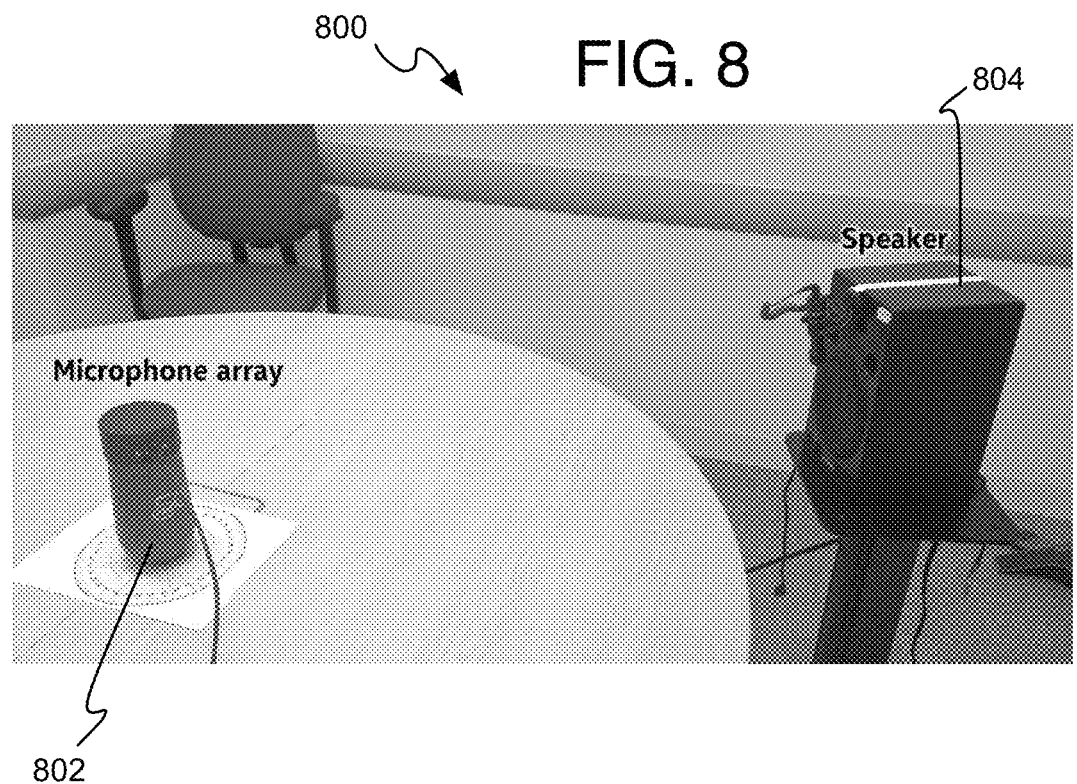
FIG. 8 is an image of a scene used to perform the testing of the method of angle of arrival detection according to one of the implementations described herein.
Figure 9:
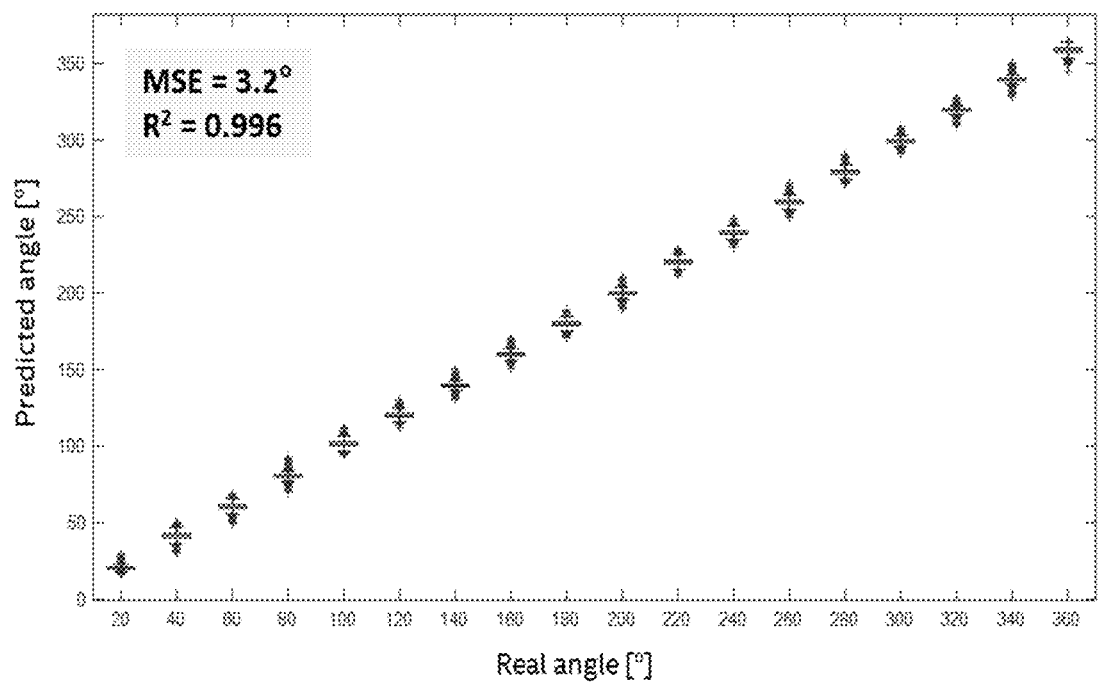
FIG. 9 is a graph of a boxplot of predicted and detected angles obtained from real acoustics by using the setting of FIG. 8 and determined by using one of the implementations herein, and versus real angles.

Referring to FIGS. 8-9, an acoustic environment or setting 800 was used to capture the acoustic waves from the real sources for the second test as described above and where the acoustic environment 800 is a conference room with a microphone array 802, such as a USB 6-microphone circular array, spaced from a speaker 804 at locations mentioned above. For this experimental test, the results produced a regression with a Mean Square Error (MSE) of about 3.2° and about a 0.995 Pearson correlation coefficient, and that is a slightly greater error and less precision than the results with the simulated data, but still showing a strong correlation. A boxplot 900 shows a graph of the predicted (or detected) angle vs the real angle using the AoA detection method described herein and on the data captured in the real conference room.

Figure 10:
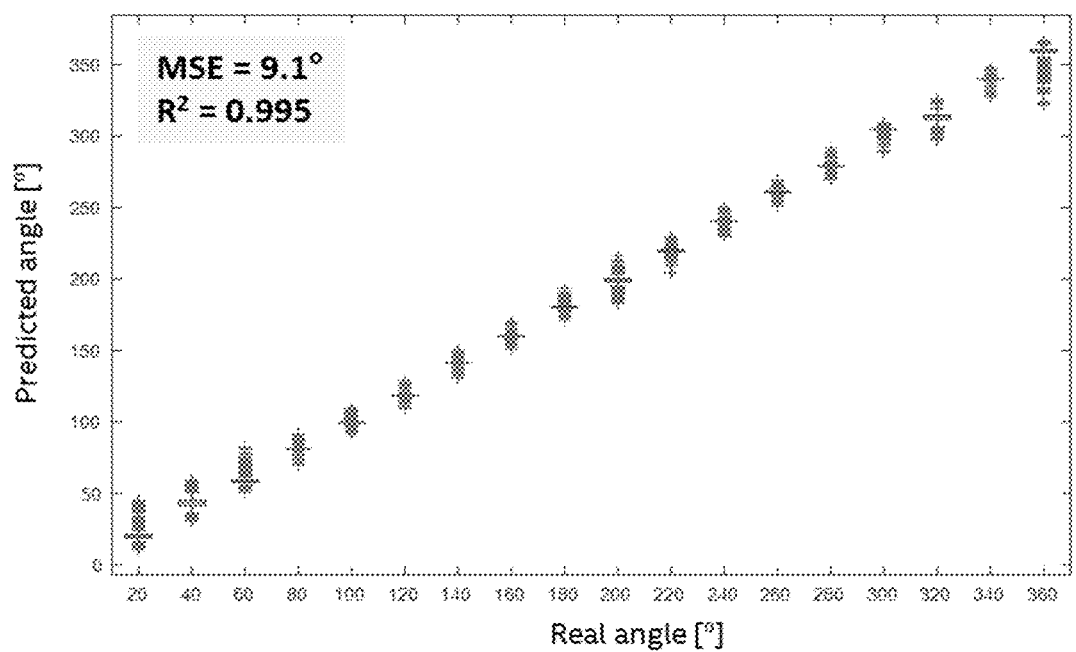
FIG. 10 is a graph of a boxplot of predicted and detected angles versus real angles determined by using conventional AoA detection algorithms and a delay technique.

Referring to FIG. 10, a third test was performed using the same real audio samples as with the second test and except also using a delayed samples technique. This third test, however, used conventional detection computation techniques with FFT and cross-correlation and a lookup table of pre-stored delay values related with certain angles, as a detection algorithm. A boxplot graph 1000 graphs predicted (detected) angle vs. real angle obtained by using the conventional technique with delayed samples and the lookup table. The results show the MSE increases significantly to 9.1°, such that the strategy here with the conventional with delay values is still less precise than the disclosed solution described above.

The profiling to obtain the correlation coefficient in the three tests of the AoA detection methods described above including both the feature extraction to form input for the classifier and the classifier routine itself was performed using a wall-clock measurement in a PC-based implementation. For that, delay detection using simple cross correlation was performed on three pairs of channels, and that time was compared with the time it took to perform the feature extraction and neural network (NN) inference proposed herein. These comparisons were performed both in MATLAB and Python (Numpy library), and were performed in samples of the same time length.

The cross correlation used in both Matlab and Numpy uses Fast Fourier Transform to accelerate its calculation, in the same way it would happen in a deployed system. This routine consists of calculating the cross correlation of time domain signals of a pair of microphones, and searching an index of the maximum value of the resulting vector. Such maximum value would be located in the exact middle of an index vector for completely aligned signals (no delay), and the location of the other comparison values in the vector and relative to the maximum value represents the delay in samples among the signals.

Ultimately, the results showed an average 4.08 times improvement of the algorithm of the disclosed method over the conventional cross correlation technique. Other well-known techniques, like GCC PHAT, are more complex and heavier in processing power. This difference in time can be greater in platforms that are not equipped with DSP acceleration hardware, or that are equipped with NN acceleration hardware (for example, Movidius™, and so forth).

It will be appreciated that processes 200, 300, 400, and/or 500 may be provided by sample audio processing system 1100 to operate at least some implementations of the present disclosure. In addition, any one or more of the operations of the processes of FIGS. 2-5 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that a logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
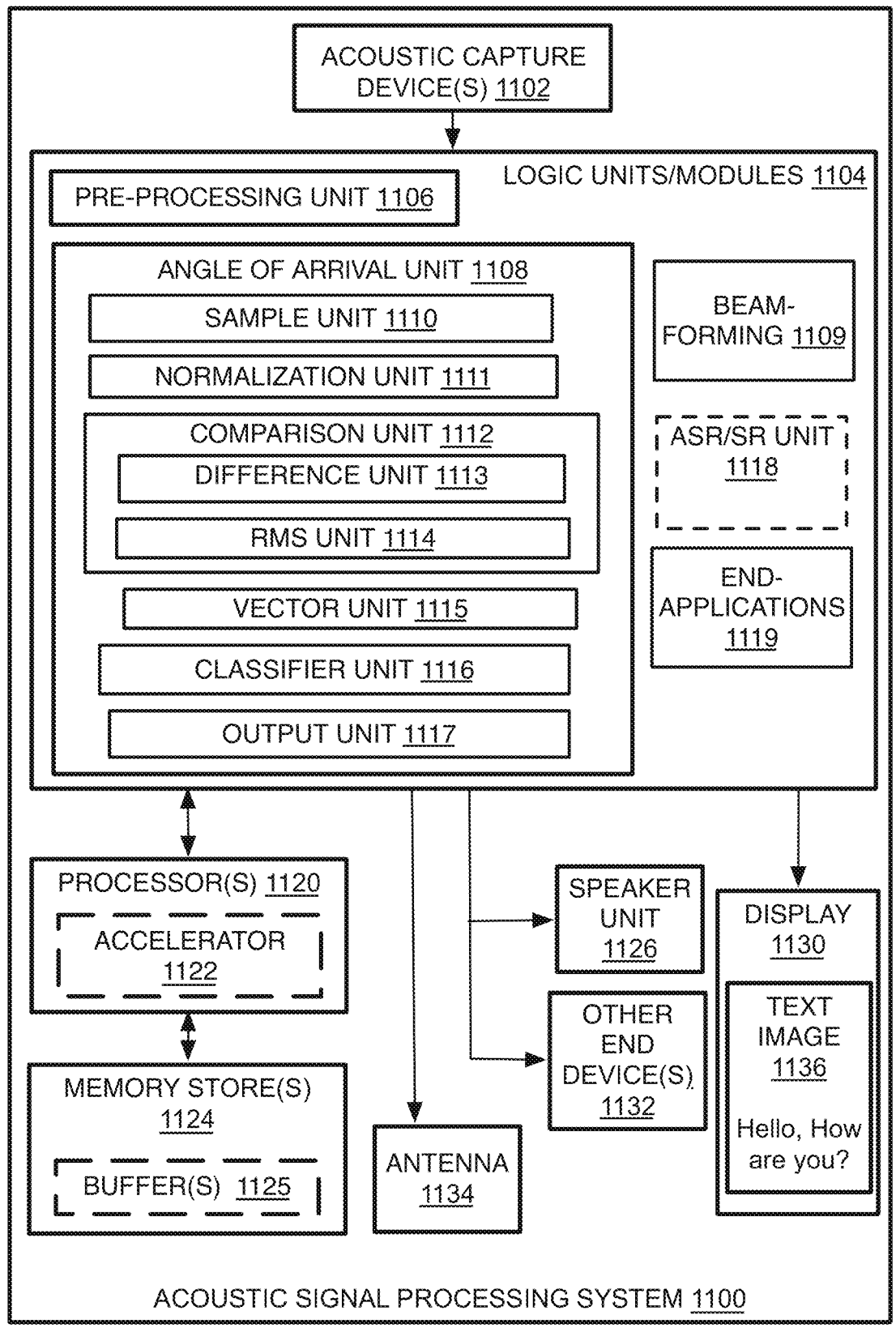
FIG. 11 is an illustrative diagram of an example system.

Referring to FIG. 11, an example acoustic signal processing system 1100 is arranged in accordance with at least some implementations of the present disclosure. In various implementations, the example acoustic signal processing system 1100 may have an acoustic capture device(s) 1102 to form or receive acoustical signal data. This can be implemented in various ways. Thus, in one form, the acoustic signal processing system 1100 is a device, or is on a device, with one or more microphones. In other examples, the acoustic signal processing system 1100 may be in communication with one or an array or network of microphones, and may be remote from these acoustic signal capture devices such that logic modules 1104 may communicate remotely with, or otherwise may be communicatively coupled to, the microphones for further processing of the acoustic data.

In either case, such technology may include a smart phone, smart speaker, a tablet, laptop or other computer, dictation machine, other sound recording machine, a mobile device or an on-board device, or any combination of these. Thus, in one form, audio capture device 1102 may include audio capture hardware including one or more sensors as well as actuator controls. These controls may be part of a sensor module or component for operating the sensor. The sensor component may be part of the audio capture device 1102, or may be part of the logical modules 1104 or both. Such sensor component can be used to convert sound waves into an electrical acoustic signal. The audio capture device 1102 also may have an A/D converter, other filters, and so forth to provide a digital signal for acoustic signal processing.

In the illustrated example, the logic modules 1104 may include a pre-processing unit 1106 that may have an analog to digital convertor, and may perform other functions as mentioned above. The logic modules 1104 also may have an angle of arrival (AoA) unit 1108 that performs the functions mentioned above. To perform the functions mentioned above, the AoA unit 1108 may have a sample unit 1110, a normalization unit 1111, a comparison unit 1112 that has a difference unit 1113 that compares samples and a RMS unit 1114 that modifies the differences into feature comparison values as described above. The AoA unit 1108 also may have a vector unit 1115 to place features in vectors and a classifier unit 1116 that receives the feature vectors as input and outputs indications of AoA also as described above. An output unit 1117 may be provided to modify the classifier output to types of values expected by other end applications.

Thus, those modules expecting output from the classifier unit and/or output unit may include a beam-forming unit 1109, and/or an ASR/VR unit 1118 that may be provided for speech or voice recognition when desired, and other end applications 1119 that may be provided to use the audio signals received by the acoustic capture device 1102. The logic modules 1104 also may include other end devices 1132 such as a coder to encode the output signals for transmission or decode input signals when audio is received via transmission. These units may be used to perform the operations described above where relevant.

The acoustic signal processing system 1100 may have one or more processors 1120 which may include a dedicated accelerator 1122 such as the Intel Atom, memory stores 1124 with one or more buffers 1125 to hold audio-related data such as delayed samples described above, at least one speaker unit 1126 to emit audio based on the input acoustic signals when desired, one or more displays 1130 to provide images 1136 of text for example, as a visual response to the acoustic signals. The other end device(s) 1132 also may perform actions in response to the acoustic signal. In one example implementation, the acoustic signal processing system 1100 may have the at least one processor 1120 communicatively coupled to the acoustic capture device(s) 1102 (such as at least two microphones) and at least one memory 1124. An antenna 1134 may be provided to transmit data or relevant commands to other devices that may use the AoA output, or may receive audio for into for AoA detection. As illustrated, any of these components may be capable of communication with one another and/or communication with portions of logic modules 1104 and/or audio capture device 1102. Thus, processors 1120 may be communicatively coupled to the audio capture device 1102, the logic modules 1104, and the memory 1124 for operating those components.

While typically the label of the units or blocks on device 1100 indicates which functions are performed by that unit, a unit may perform different functions or mix of functions than that suggested by the unit label. Also, although acoustic signal processing system 1100, as shown in FIG. 11, may include one particular set of blocks or actions associated with particular components or modules, these blocks or actions may be associated with different components or modules than the particular component or module illustrated here.

Figure 12:
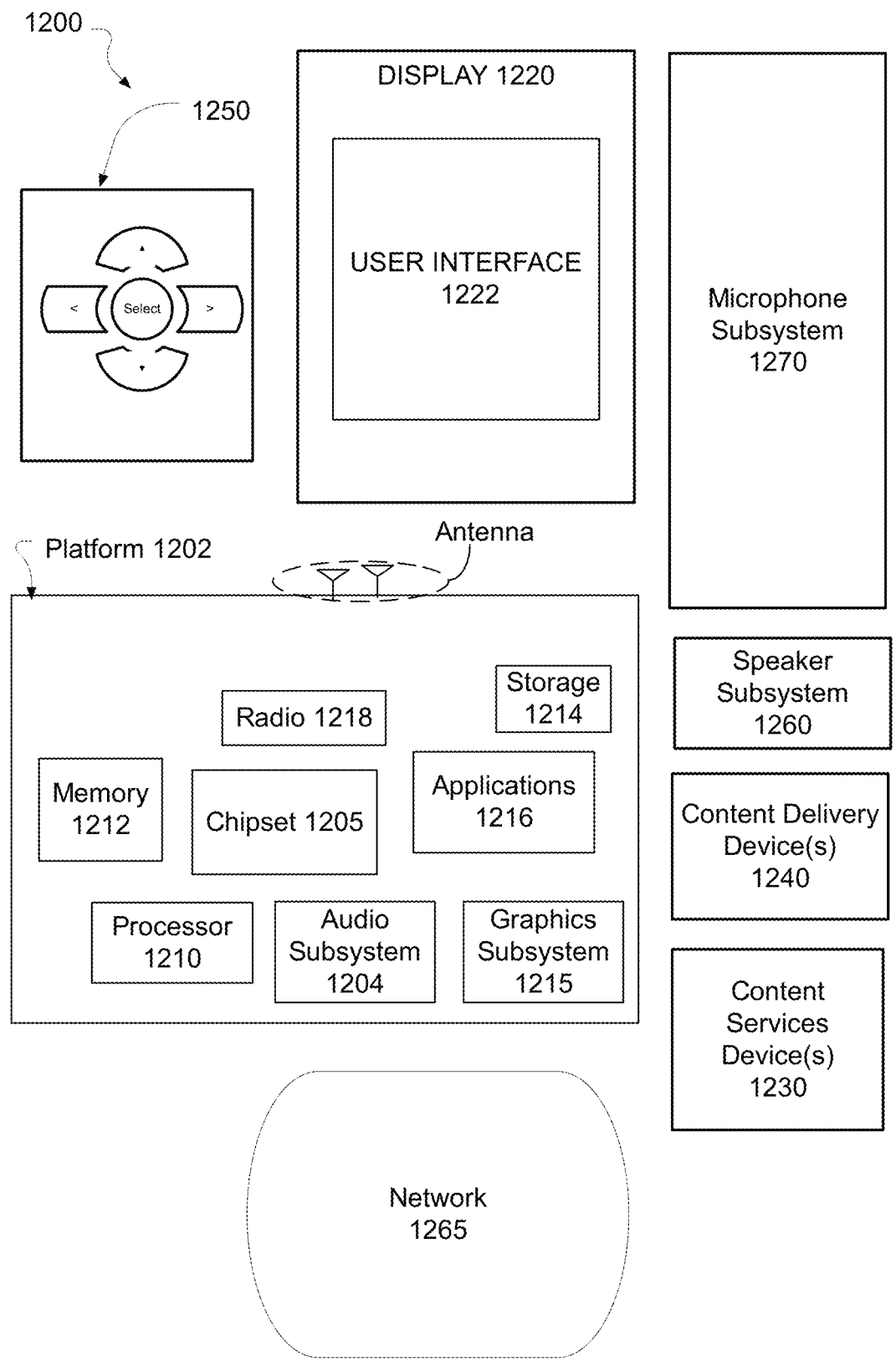
FIG. 12 is an illustrative diagram of another example system.

Referring to FIG. 12, an example system 1200 in accordance with the present disclosure operates one or more aspects of the speech processing system described herein. It will be understood from the nature of the system components described below that such components may be associated with, or used to operate, certain part or parts of the speech processing system described above. In various implementations, system 1200 may be a media system although system 1200 is not limited to this context. For example, system 1200 may be incorporated into multiple microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having a network of acoustic signal producing devices.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202, speaker subsystem 1260, microphone subsystem 1270, and/or display 1220. Each of these components is described in greater detail below.

In various implementations, platform 1202 may include any combination of a chipset 1205, processor 1210, memory 1212, storage 1214, audio subsystem 1204, graphics subsystem 1215, applications 1216 and/or radio 1218. Chipset 1205 may provide intercommunication among processor 1210, memory 1212, storage 1214, audio subsystem 1204, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Audio subsystem 1204 may perform processing of audio such as acoustic signals for one or more audio-based applications such as speech recognition, speaker recognition, and so forth. The audio subsystem 1204 may comprise one or more processing units, memories, and accelerators. Such an audio subsystem may be integrated into processor 1210 or chipset 1205. In some implementations, the audio subsystem

1204 may be a stand-alone card communicatively coupled to chipset 1205. An interface may be used to communicatively couple the audio subsystem 1204 to a speaker subsystem 1260, microphone subsystem 1270, and/or display 1220.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220, speaker subsystem 1260, and microphone subsystem 1270. Platform 1202 and/or content services device(s) 1230 may be coupled to a network 1265 to communicate (e.g., send and/or receive) media information to and from network 1265. Content delivery device(s) 1240 also may be coupled to platform 1202, speaker subsystem 1260, microphone subsystem 1270, and/or to display 1220.

In various implementations, content services device(s) 1230 may include a network of microphones, a cable television box, personal computer, network, telephone, Internet enabled devices or appliance capable of delivering digital information and/or content, and any other similar device capable of unidirectionally or bidirectionally communicating content between content providers and platform 1202 and speaker subsystem 1260, microphone subsystem 1270, and/or display 1220, via network 1265 or directly. It will be appreciated that the content may be communicated unidirectionally and/or bidirectionally to and from any one of the components in system 1200 and a content provider via network 1265. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1204 also may be used to control the motion of articles or selection of commands on the interface 1222.

Movements of the navigation features of controller 1250 may be replicated on a display (e.g., display 1220) by movements of a pointer, cursor, focus ring, or other visual indicators displayed on the display or by audio commands. For example, under the control of software applications 1216, the navigation features located on navigation controller 1250 may be mapped to virtual navigation features displayed on user interface 1222, for example. In embodiments, controller 1250 may not be a separate component but may be integrated into platform 1202, speaker subsystem 1260, microphone subsystem 1270, and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example, or by auditory command. Program logic may allow platform 1202 to stream content to media adaptors or other content services device(s) 1230 or content delivery device(s) 1240 even when the platform is turned "off" In addition, chipset 1205 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202, speaker subsystem 1260, microphone subsystem 1270, and/or display 1220 may be an integrated unit.

Display 1220, speaker subsystem 1260, and/or microphone subsystem 1270 and content service device(s) 1230 may be integrated, or display 1220, speaker subsystem 1260, and/or microphone subsystem 1270 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
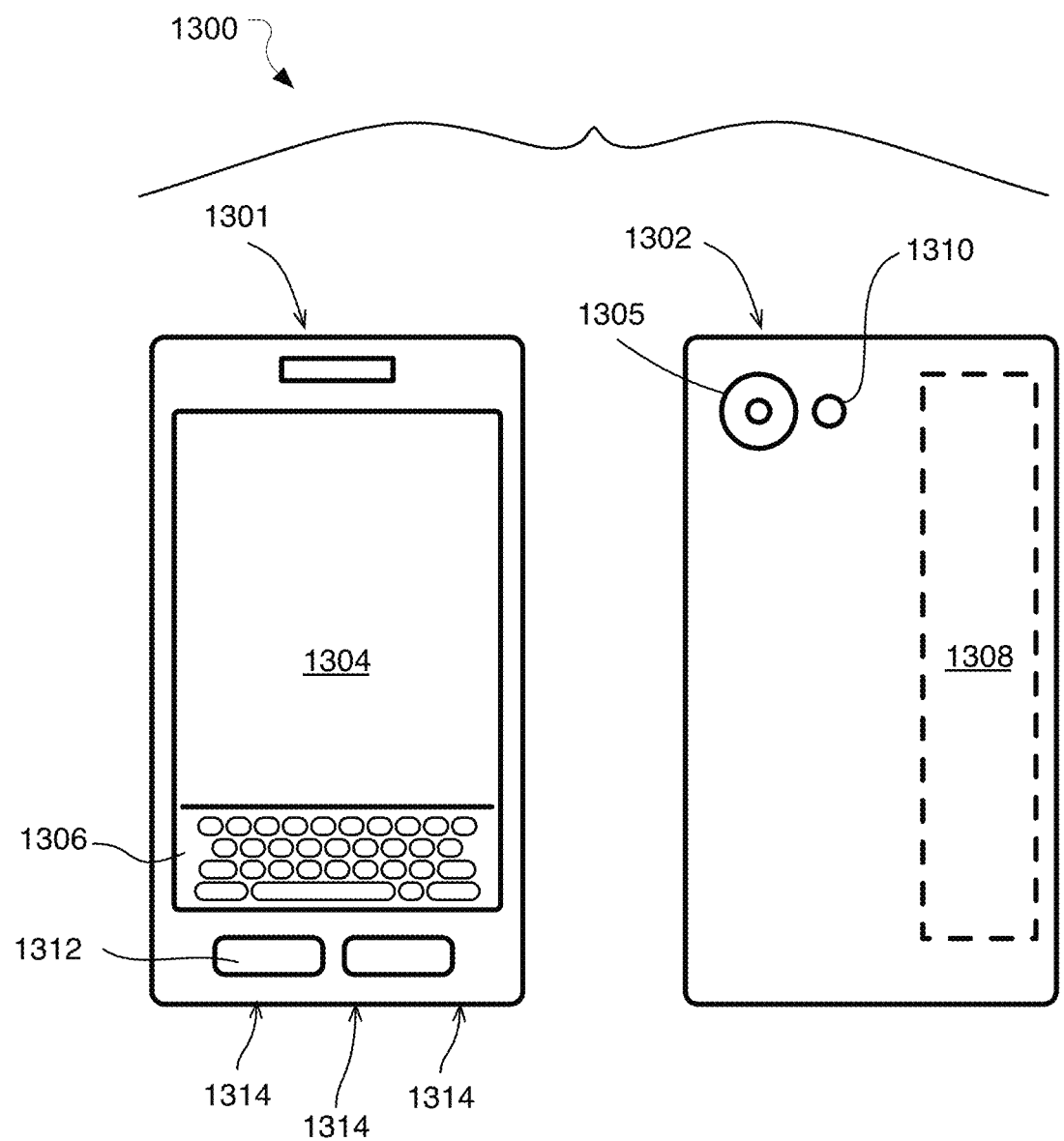
FIG. 13 illustrates another example device, all arranged in accordance with at least some implementations of the present disclosure.

Referring to FIG. 13, a small form factor device 1300 is one example of the varying physical styles or form factors in which systems 1100 or 1200 may be embodied. By this approach, device 1300 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, microphone system or network, and so forth, and any other on-board (such as on a vehicle), or building, computer that may accept audio commands.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphones 1314 of a microphone array. As shown, device 1300 may include a camera 1305 (e.g., including a lens, an aperture, and an imaging sensor) and a flash 1310 integrated into back 1302 (or elsewhere) of device 1300.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), fixed function hardware, field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example first implementation, a computer-implemented method of acoustic angle of arrival detection comprises receiving, by at least one processor, multiple audio signals from at least two microphone channels, wherein each channel provides an audio signal from a different microphone; sampling the audio signals at a plurality of times to form audio samples of each channel; generating same-time comparison values comprising comparing the audio samples of different channels and generated along the audio signals at substantially a same time frame; generating delay comparison values comprising comparing the audio values that are both of different channels and of at least partially different time frames generated along the audio signal; and determining an acoustic angle of arrival of acoustics forming the audio signals and comprising using both the same-time comparison values and the delay comparison values.

In furtherance of the first implementation, the comparing related to both the same-time and delay comparisons comprises determining the root mean square of the difference between audio samples that are being compared.

In furtherance of the first implementation, the method comprises inputting a version of the same-time and delay comparison values into a classifier neural network to form the acoustic angle of arrival.

In furtherance of the first implementation, the method comprises inputting a version of the same-time and delay comparison values into a classifier neural network to form the acoustic angle of arrival, wherein each output of the neural network is associated with an angle of arrival relative to a reference direction.

In furtherance of the first implementation, the method comprises inputting a version of the same-time and delay comparison values into a classifier neural network to form the acoustic angle of arrival, wherein the same-time and delay comparison values together form a concatenated vector that is input to the neural network.

In furtherance of the first implementation, the method comprises inputting a version of the same-time and delay comparison values into a classifier neural network to form the acoustic angle of arrival, wherein the neural network only has three layers: an input layer, one hidden layer, and an output layer.

In furtherance of the first implementation, the method comprises normalizing the audio values before performing the comparisons.

In furtherance of the first implementation, the method comprises obtaining the angle of arrival without converting the audio signal values into a frequency domain.

In furtherance of the first implementation, the method comprises obtaining the angle of arrival without using specific function hardware directed to obtaining the angle of arrival from the audio signals.

In furtherance of the first implementation, the method comprises a delay measured by the number of the samples of time frames and being two to form the delay comparison values.

In furtherance of the first implementation, the audio sample of each channel is compared to audio samples of all other channels to form both the same-time and delay comparison values.

By an example second implementation, a system of acoustic angle of arrival detection, comprises at least two microphones to receive at least two acoustic signals in an actual acoustic environment; at least one memory communicatively coupled to the at least two microphones; and at least one processor communicatively connected to the at least two microphones and at least one memory, the at least one processor being arranged to operate by: receiving multiple audio signals from at least two microphone channels, wherein each channel provides an audio signal from one of the microphones; sampling the audio signals at a plurality of times to form audio values of each channel; generating comparison values comprising differencing the audio values of different channels and determining a root mean square average of the differences; and determining an acoustic angle of arrival of acoustics forming the audio signals and comprising using comparisons values.

In furtherance of the second implementation, the comparison values are input into a classifier neural network having outputs that individually indicate an angle of arrival relative to a reference direction.

In furtherance of the second implementation, the generating comparison values comprises: generating same-time comparison values comprising comparing the audio values generated along the audio signals at substantially a same time frame.

In furtherance of the second implementation, the generating comparison values comprises: generating same-time comparison values comprising comparing the audio values generated along the audio signals at substantially a same time frame, wherein the audio sample of each channel is compared to the audio sample of all other channels and of the same time frame to form the same-time comparison values.

In furtherance of the second implementation, the generating comparison values comprises: generating same-time comparison values comprising comparing the audio values generated along the audio signals at substantially a same time frame, wherein generating comparison values comprises: generating delay comparison values comprising comparing the audio values of at least partially different time frames generated along the audio signal.

In furtherance of the second implementation, the generating comparison values comprises: generating same-time comparison values comprising comparing the audio values generated along the audio signals at substantially a same time frame, wherein generating comparison values comprises: generating delay comparison values comprising comparing the audio values of at least partially different time frames generated along the audio signal, and wherein the audio sample of each channel at one time frame is compared to the audio sample of all other channels at a time frame that is different than the one time frame to form the delay comparison values.

In furtherance of the second implementation, the generating comparison values comprises: generating same-time comparison values comprising comparing the audio values generated along the audio signals at substantially a same time frame, wherein generating comparison values comprises: generating delay comparison values comprising comparing the audio values of at least partially different time frames generated along the audio signal, wherein the at least one processor is arranged to operate by: placing a version of the same-time and delay comparison values into a concatenated vector; and inputting the vector into a classifier neural network that has outputs associated with angles of arrival.

In furtherance of the second implementation, the generating comparison values comprises: generating same-time comparison values comprising comparing the audio values generated along the audio signals at substantially a same time frame, wherein generating comparison values comprises: generating delay comparison values comprising comparing the audio values of at least partially different time frames generated along the audio signal, wherein the delay comparison values are formed by counting a delay measured by the number of the samples along the audio signals and being two to form the delay comparison values.

In furtherance of the second implementation, the at least one processor is to operate by obtaining the angle of arrival from the audio signals without converting the audio signal values to a frequency domain.

In furtherance of the second implementation, the angle of arrival is obtained by using the audio signals without the use of a digital signal processor (DSP).

By an example third implementation, at least one non-transitory computer readable medium comprising a plurality of instructions that in response to being executed on a computing device, causes the computing device to operate by: receiving a same-time comparison values generated by comparing the audio values generated along the audio signals at substantially a same time frame; receiving delay comparison values comprising comparing the audio values of at least partially different time frames generated along the audio signal; and inputting the same-time and delay comparison values to a classifier neural network that outputs probabilities of an angle of arrival being associated with one or more angles.

In furtherance of the third implementation, the same-time comparison values and delay comparison values are concatenated into a single vector before being input to the classifier neural network.

In furtherance of the third implementation, the same-time comparison values and delay comparison values are concatenated into a single vector before being input to the classifier neural network, and wherein the comparisons are performed by computing the root mean square of the difference between audio values being compared, and without converting audio values into the frequency domain.

In furtherance of the third implementation, the different time frames are a predetermined number of samples apart.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of acoustic angle of arrival detection comprising:
   receiving, by at least one processor, multiple audio signals from at least two microphone channels, wherein each channel provides an audio signal from a different microphone;
   sampling the audio signals at a plurality of time frames to form audio samples of each channel;
   generating same-time comparison values comprising comparing the audio samples of different channels and generated at a same time frame;
   generating delay comparison values comprising comparing the audio samples that are both of different channels and of at least partially different time frames; and
   determining an acoustic angle of arrival of acoustics forming the audio signals and comprising using both the same-time comparison values and the delay comparison values.

2. The method of claim 1 wherein the comparing related to both the same-time and delay comparisons comprises determining the root mean square of a difference between audio samples that are being compared.

3. The method of claim 1 comprising inputting a version of the same-time and delay comparison values into a classifier neural network to form the acoustic angle of arrival.

4. The method of claim 3 wherein each output of the neural network is associated with an angle of arrival relative to a reference direction.

5. The method of claim 3 wherein the same-time and delay comparison values together form a concatenated vector that is input to the neural network.

6. The method of claim 3 wherein the neural network only has three layers: an input layer, one hidden layer, and an output layer.

7. The method of claim 1 comprising normalizing the audio samples before performing the comparisons.

8. The method of claim 1 comprising obtaining the angle of arrival without converting the audio values into a frequency domain.

9. The method of claim 1 comprising obtaining the angle of arrival without using specific function hardware directed to obtaining the angle of arrival from the audio signals.

10. The method of claim 1 comprising using a delay measured by the number of the samples of time frames and being two to form the delay comparison values.

11. The method of claim 1 wherein the audio sample of each channel is compared to audio samples of all other channels to form both the same-time and delay comparison values.

12. A system of acoustic angle of arrival detection, comprising:
    at least two microphones to receive at least two acoustic signals in an actual acoustic environment;
    at least one memory communicatively coupled to the at least two microphones; and
    at least one processor communicatively connected to the at least two microphones and at least one memory, the at least one processor being arranged to operate by:
    receiving multiple audio signals from at least two microphone channels, wherein each channel provides an audio signal from one of the microphones;
    sampling the audio signals at a plurality of times to form audio values of each channel;
    generating comparison values comprising differencing the audio values of different channels and determining a root mean square average of the differences; and determining an acoustic angle of arrival of acoustics forming the audio signals and comprising using the comparison values.

13. The system of claim 12 wherein the comparison values are input into a classifier neural network having outputs that individually indicate an angle of arrival relative to a reference direction.

14. The system of claim 12 wherein generating comparison values comprises:
generating same-time comparison values comprising comparing the audio values generated at a same time frame.

15. The system of claim 14 wherein the audio value of each channel is compared to the audio value of all other channels and of the same time frame to form the same-time comparison values.

16. The system of claim 14 wherein generating comparison values comprises:
generating delay comparison values comprising comparing the audio values of at least partially different time frames.

17. The system of claim 16 wherein the audio values of multiple channels at one time frame is compared to the audio values of other channels at a time frame that is different than the one time frame to form the delay comparison values.

18. The system of claim 16 wherein the at least one processor is arranged to operate by:
placing a version of the same-time and delay comparison values into a concatenated vector; and inputting the vector into a classifier neural network that has outputs associated with angles of arrival.

19. The system of claim 16 wherein the delay comparison values are formed by counting a delay measured by the number of the samples over time and being two to form the delay comparison values.

20. The system of claim 12 wherein the at least one processor is to operate by obtaining the angle of arrival from the audio values without converting the audio values to a frequency domain.

21. The system of claim 12 wherein the angle of arrival is obtained by using the audio signals without the use of a digital signal processor (DSP).

22. At least one non-transitory computer readable medium comprising a plurality of instructions that in response to being executed on a computing device, causes the computing device to operate by:
receiving same-time comparison values generated by comparing audio values of a plurality of channels and generated at a same time frame;
receiving delay comparison values comprising comparing audio values of at least partially different time frames; and
inputting the same-time and delay comparison values to a classifier neural network that outputs probabilities of an angle of arrival being associated with one or more angles.

23. The medium of claim 22 wherein the same-time comparison values and delay comparison values are concatenated into a single vector before being input to the classifier neural network.

24. The medium of claim 23 wherein the comparisons are performed by computing the root mean square of a difference between audio values being compared, and without converting the audio values into a frequency domain.

25. The medium of claim 22 wherein the different time frames are a predetermined number of samples apart.

* * * * *